Jan. 14, 1947.   J. F. STOECK ET AL   2,414,343
AUTOMOBILE LIGHTING DEVICE
Filed Sept. 26, 1944
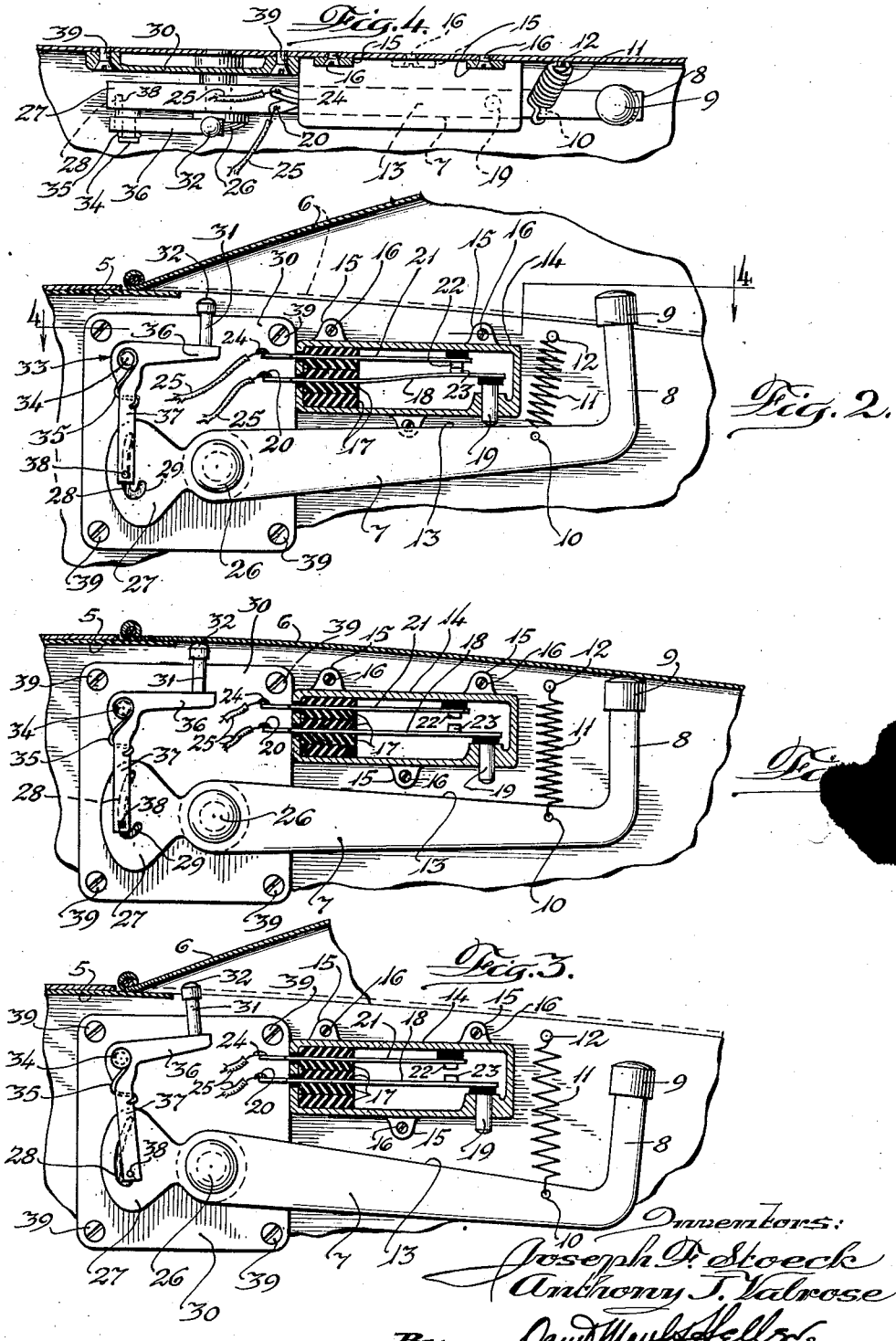

Patented Jan. 14, 1947

2,414,343

UNITED STATES PATENT OFFICE 2,414,343

AUTOMOBILE LIGHTING DEVICE

Joseph F. Stoeck and Anthony J. Valrose, Chicago, Ill.

Application September 26, 1944, Serial No. 555,802

1 Claim. (Cl. 200—54)

Our invention appertains to switch means associated with automobile hood means for controlling the operation of an electrical instrument inter-connecting the operation of the said hood thru the said switch means to pass current to the said electrical instrument.

An important object of our invention is to provide a switch means which will close the circuit when an automobile hood with which it is associated is open, and conversely to open the said electrical circuit when the said automobile hood is closed.

Another object of our invention is to provide switch means of the aforementioned character which may be independently and manually controlled for opening the circuit when the automobile hood is open as for daylight use, at the same time providing trip means which will automatically trip the said switch means when the automobile hood is being closed by initially contacting the said trip means, releasing the switch control means for normal operation, namely of opening the circuit when the hood is closed, and closing the circuit when the hood is opened.

Another object of our invention is to provide a combined switch and trip means of elemental construction which is simple to operate, practical in its operation, useful and efficient in the work performed thereby, and of such simple construction that it can be manufactured economically in production in quantities.

Other features, objects and advantages inherent in our invention will become apparent from an examination of the accompanying drawing, having reference to the ensuing description; wherein like symbols are used to designate like parts, and in which:

Fig. 1 shows a partial cross-sectional view of the electrical switch and trip means comprising our invention in the position the various elements occupy when the hood of the automobile with which it is associated is closed.

Fig. 2 is a cross-sectional view similar to Figure 1, with the exception that the elemental structure comprising our switch and trip invention is shown with its elemental structure in the position occupied when the hood of an automobile with which it may be associated is opened.

Fig. 3 shows the position of the switch element when the trip means has been actuated so as to lock the same to prevent closing of the circuit even tho the hood of the automobile with which it may be associated is open.

Fig. 4 is a top view partially in cross-section as seen when looking in the direction of the arrows on the line 4—4 of Figure 2.

This application is a continuation-in-part of our copending and prior patent application filed January 13, 1944, identified by Serial Number 518,040. Referring to the various views, the hood supporting structure 5 is adapted to hold the articulately pivoted hood units 6, which occupy the dotted position when closed in Figure 2, or the full line position as indicated in Figure 1.

The elemental structure comprising our switch and trip means is comprised of a lever 7, having an extension 8 on which is secured the cap 9, having a dome-shaped upper portion so as to cooperate most effectively with the hood structure 6. The said lever 7 is provided with a hole 10, and pin 12 being attached to the dash of the automobile in order to support the resilient spring element 11, tending to maintain, normally, the lever 7 in the position shown in Figure 2.

A casing 14 having ears or lugs 15 secured in place by virtue of screws 16 is also attached to the dash facing, and is adapted to retain the contacts 21 and 18 in insulated assemblage because of elements 17; the contact 21 being provided with a contact point 22, whereas the contact 18 is provided with a contacting point 23, the termini of the contact elements 18 and 21 or respectively 24 and 20 acting as terminals for connection to the wires 25 which may be connected to a lamp or other similar electrical instrumentality, interposing in the circuit a source of electrical energy.

The lever 7 is pivoted by virtue of a pivot pin 26, and is provided with a rearward extension 27 having a cam slotted portion 28, within it, which is radially spaced from the center of the pivot element 26, and is provided with a locking recess portion 29, the purpose of which will be hereinafter, more clearly, elucidated.

The tripping means is comprised of a base mounting structure 30 secured in place by the screws 39, the said base offering support for the pivot pin 26 and also for the trip means which is comprised of a bell-crank 33 having legs 36 and 37 being articulately positioned on the base member 30 by means of a pivot pin 34 to which is secured the resilient element or spring 35, which has a tendency to pull the leg 37 of the bell-crank 33 to the right as shown in Figure 3 when the device is in locked position.

The resilient contact element 18 is also provided with a slidable pin member 19 mounted within the housing 14 which is physically in contact with the upper portion 13 of the lever 7, so that when the same moves upwardly, the pin 19 is moved upwardly causing contact between the contact points 22 and 23 closing the circuit. The spring means 11 tends to maintain this contact firmly thus establishing connection for the electrical circuit to be completed.

The operation of our invention is as follows: Referring to Figure 2, when the hood 6 is brought downward, it is to be noted that the trip means by virtue of its guide pin 38 attached to the extension 37 of the bell-crank 33, will ride idly in the arcuate slotted portion 28 without affecting the same to any extent, so that when the hood 6 is brought down as shown in Figure 1, it will depress the lever 7 about its pivot 26 elongating the spring 11 and breaking physical contact with the pin 19 which because of the springy nature of the contact element 18 will cause the circuit to be broken as evidenced by the separated contact points 22 and 23.

It is to be noted in this view, that the lever 33 to which is attached the pin element 31, having a dome-shaped cap or head 32, is in a position tangent to the under surface of the hood 6 when in closed position so that the same will not be acted upon when the hood is closed or open, it remains in the same position by virtue of the arcuate slot 28 operating about the pin 38. Moreover, if the switching means is used to operate the trouble lamp for an automobile which is to be used for certain inaccessible portions during the night time, the operation will be such that when the hood is open the lamp will be turned on inasmuch as the circuit will be closed and vice versa.

However, if it should be desired to perform some operation on an automobile under the hood during the day time when artificial light is unnecessary, the trip means comes into play in the following manner: After opening the hood 6, the lever 7 will, normally, occupy the position shown in Figure 2, by depressing the same to within its full limited movement, the trip means will be actuated by the spring 35 pushing it inwardly so that when the lever is depressed to its most downward position, the pin will snap into the hook-like slot 29 and thus retain the lever 7 in its depressed position with the spring 11 extended, and allowing the circuit to remain open as evidenced by the contact point 22 and 23 being separated. However, when the hood is to be closed after completing the work, it is to be noted that the tripper pin 31 is positioned so as to be first contacted by the hood in its downward motion which tends to articulate the bell-crank 33, release the pin 38 from hooking engagement, returning it back into the arcuate slot 28 causing it to idle in the said slot.

The spring 11 thus again maintains the lever 7 within the confines predicated on the relationship of the open and closed hood portions 6. Thus it can be seen, that our invention will function automatically with the opening and closing of an automobile hood, or the trip means may be set to render inactive the switch means for daylight purposes, yet the closing of the hood will automatically operate the trip means, returning the control of operation of the switch solely to the automobile hood.

Altho we have herein expounded and revealed the nature and operation of our invention, it is to be understood that we, hereby, reserve the right to all improvements falling within the scope and spirit of the invention disclosed, our invention to be limited only to the subjoined claim.

Having thus described and revealed our invention what we claim as novel and desire to secure by Letters Patent is:

A trip switch mechanism of the character described comprising, a switch casing, a stationary switch blade mounted in said switch casing, a resilient switch blade mounted in said switch casing and normally maintained in spaced apart relationship with respect to the said stationary terminal, spring-urged trip means pivotally mounted with respect to the said switch casing and adapted normally to close the circuit between the said stationary and resilient terminals, the said trip means being provided with an extension having an arcuate slot therein terminating in an offset locking recess, and spring urged trip locking means articulately mounted and having an extension thereof in engagement with the said arcuate slot, the said trip locking means adapted to lock the said trip means in inoperative position when the said extension thereof engages the said offset locking recess, and being further adapted to be tripped out of locking engagement with the said trip means.

JOSEPH F. STOECK.
ANTHONY J. VALROSE